United States Patent

[11] 3,581,576

| [72] | Inventor | Alfred A. Reiser |
| | | 6976 Old Lake Shore Road, Lake View, N.Y. 14085 |
| [21] | Appl. No. | 744,055 |
| [22] | Filed | July 11, 1968 |
| [45] | Patented | June 1, 1971 |

[54] UNBALANCE DETECTOR FOR ROTATABLE BODY
8 Claims, 10 Drawing Figs.

| [52] | U.S. Cl. | 73/459 |
| [51] | Int. Cl. | G01m 1/22 |
| [50] | Field of Search | 73/66, 459 |

[56] References Cited
UNITED STATES PATENTS

| 2,214,758 | 9/1940 | Bell | 73/66 |
| 2,334,991 | 11/1943 | Castiglia | 73/459X |

Primary Examiner—James J. Gill
Attorney—Sommer, Weber & Gastel

ABSTRACT: A device for detecting the location and amount of unbalance in a rotatable body such as a rubber-tired automobile wheel having an overweight point in its peripheral area, comprising supporting the wheel for rotation about an axis at an acute angle to the horizontal while allowing the wheel support to oscillate about a horizontal axis arranged in a vertical plane intersecting with the plane of rotation of the wheel near the top thereof, and indicating the extent of unbalance when the overweight point on the wheel arrives at the lower extreme of its vertical movement during wheel rotation.

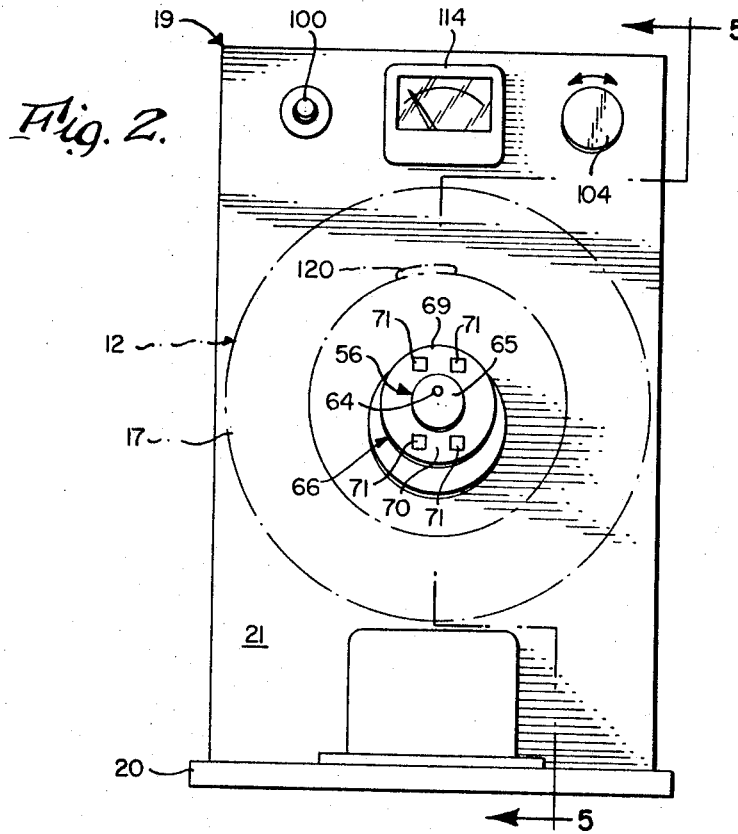
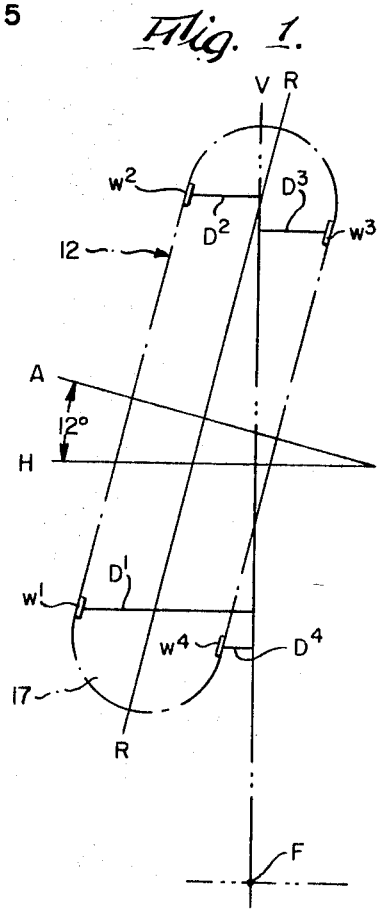
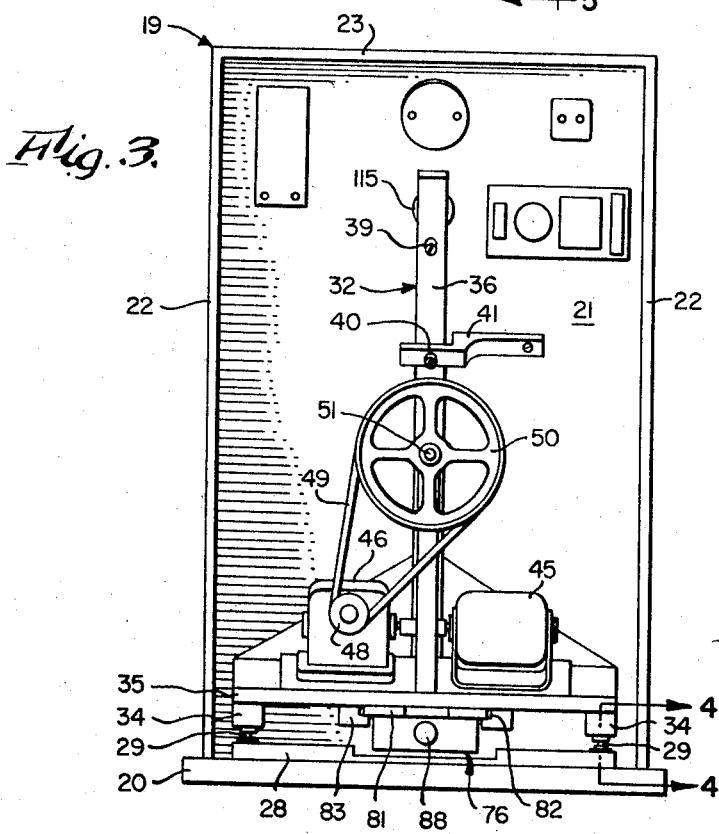
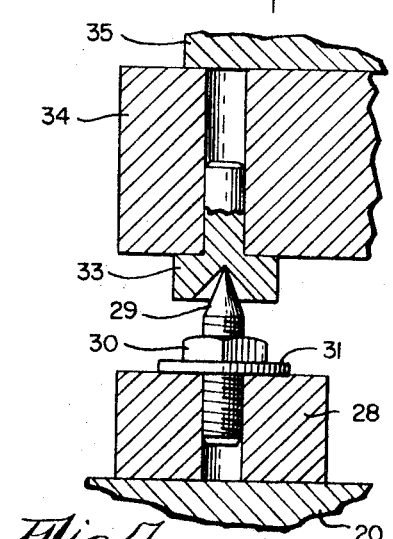
INVENTOR.
ALFRED A. REISER
BY Sommer + Weber
ATTORNEYS

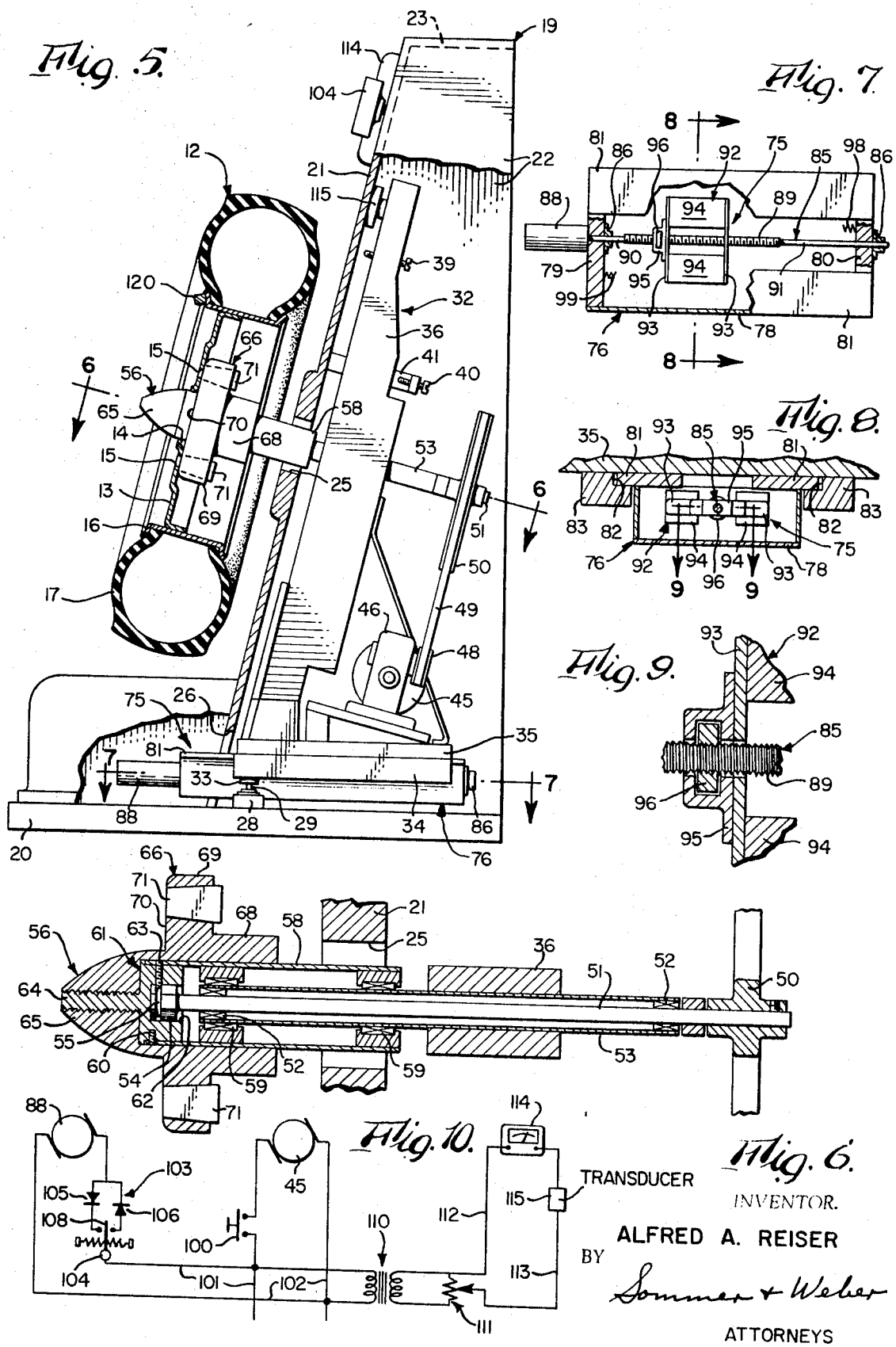

UNBALANCE DETECTOR FOR ROTATABLE BODY

The present invention relates to an unbalance detector for a rotatable body.

To determine the amount and location of static or dynamic unbalance of, say, a rubber-tired automobile wheel with a plurality of peripheral overweight points on opposite sides of its central plane of rotation, the present invention contemplates a wheel-supporting structure, having a post rising from a bottom part, fulcrumed on a base to oscillate on a horizontal fulcrum axis. The wheel is removably journaled at the top of the post on a rotation axis extending transversely of this fulcrum axis and at about 12° included angle with reference to the horizontal. The wheel is located in a vertical plane coincident with this fulcrum axis and is slowly rotated, the overweight point being outstandingly effective in oscillating the wheel and supporting structure on the fulcrum axis, when the overweight point comes to the bottom of the rotating wheel and when it is located the greatest distance horizontally from this vertical plane. The timing and degree of this oscillation is detected, the wheel rotation stopped, a balancing weight of the indicated value attached to the top of the wheel on the corresponding side, and the procedure repeated to determine whether lower value overweight peripheral points exist on the same side of the wheel and which are corrected in like manner. The wheel is then removed, reversed in position and again journaled on the supporting structure, and unbalance of the opposite face side of the wheel periphery corrected as above outlined. A counterweight on the supporting structure bottom part is adjustable horizontally lengthwise of the rotation axis to balance the rotating wheel and supporting structure statically and hence render the detecting means sensitive to the peripheral unbalance of the wheel.

In the accompanying drawings, FIG. 1 is a diagrammatic representation illustrating the principles underlining the action of my unbalance detector. FIG. 2 is a front elevational view thereof. FIG. 3 is a rear elevational view with the back cover removed. FIG. 4 is a greatly enlarged fragmentary vertical section taken on line 4–4, FIG. 3. FIG. 5 is an enlarged vertical fore-and-aft section taken generally on line 5–5, FIG. 2, with parts being shown in elevation. FIG. 6 is a further enlarged fragmentary horizontal section taken on line 6–6, FIG. 5. FIG. 7 is a fragmentary horizontal section taken on line 7–7, FIG. 5. FIG. 8 is a fragmentary vertical section taken generally on line 8–8, FIG. 7. FIG. 9 is an enlarged fragmentary horizontal section taken on line 9–9, FIG. 8. FIG. 10 is a wiring diagram of the electrical components.

FIG. 1 diagrammatically illustrates the principle of action induced by the rotatable body under test in determining the amount and location of any peripheral unbalance thereof. The rotatable body is shown as being a rubber-tired casing-wheel assembly 12 having a conventional circular sheet metal wheel body 13 provided with a central hub opening 14 surrounded by the holes 15 which receive the conventional hug attachment lugs (not shown) and having a sheet metal channel-shaped rim 16 supporting a conventional tubeless tire 17. For balancing the casing-wheel assembly 12, it is removed from the automobile and is placed on the subject detector with its axis A of rotation being at an acute included angle (less than 90°) with reference to the horizontal H, the preferred angularity being about 12° as shown. The casing-wheel assembly 12 is also supported on a horizontal fulcrum axis F which extends transversely of the rotation axis A and is arranged below the wheel 12 and preferably in a vertical plane V which intersects the top of the tire 17 so that the plane V is arranged external to the bottom part of the tire 17 and hence remote from the central plane of rotation R of the casing-wheel assembly 12, whereas this vertical plane V intersects this central plane of rotation R near the top of the tilted tire 17. The wheel 12, when slowly rotated, is free to oscillate back and forth, in the manner of an inverted pendulum, about this bottom horizontal fulcrum axis F in response to a condition of unbalance of the tire 17. Such unbalance can occur on either side of the central plane of rotation R of the casing-wheel assembly 12 and at any overweight point or points around the periphery of the tire thereof. Four points of possible overweight are indicated at $w^1$, $w^2$, $w^3$ and $w^4$.

It will particularly be noted that the overweight point at position $w^1$ is located a long horizontal distance $D^1$ from the vertical plane V, whereas overweight points at positions $w^2$, $w^3$ and $w^4$ are located the much shorter horizontal distances $D^2$, $D^3$ and $D^4$ from this vertical plane V. As a consequence, overweight at point $w^1$ is far more effective in oscillating the casing-wheel assembly 12 about the fulcrum axis F than at points $w^2$, $w^3$ and $w^4$ as further explained in detail.

The detector is shown as comprising a stationary casing 19 mounted on a base 20 and having a generally flat front wall 21 which is inclined at an included angle of about 12°. The casing is also shown as having sidewalls 22 and a top wall 23 and for clarity the back is shown as being open although this would normally be closed by a cover (not shown). The casing 19 is provided in its front wall 21 with a central circular opening 25 and a bottom opening 26.

The base 20 carries a stationary horizontal crossbar 28 within the stationary casing 19 and immediately in rear of the bottom of its front wall 21. This crossbar supports, at its opposite ends, two hardened stationary steel fulcrum points 29 which are preferably vertically adjustable. For this purpose, as best shown in FIG. 4, each fulcrum point comprises the pointed upper end of a screw in the vertical threaded bore in the corresponding end of the crossbar 28. A lock nut 30 and washer 31 maintains the adjusted elevation of each fulcrum point 29.

The pair of fulcrum points rockably support a tiltable assembly or casing-wheel-assembly-supporting means 32 so that the latter is capable of oscillating about the horizontal transverse fixed axis F designated in FIG. 1. For this purpose, each fulcrum point 29 supports a downwardly opening socket member 33 which in turn supports the front ends of fore-and-aft bars 34 supporting the sides of a horizontal base plate 35 of this casing-wheel-assembly-supporting means 32. This casing-wheel-assembly-supporting means 32 also includes a rigid post 36 rising from the center front part of this base plate 35 and extending generally parallel with the casing front wall 21 and hence at an included angle of about 12° with reference to the vertical. The movement of the tiltable assembly casing-wheel-assembly-supporting means 32 formed by the post 36, bottom plate 35 and fore-and-aft bottom sidebars 34 is limited, in a forward direction, by an adjustable screw 39 in the top of the post 36 and the forward end of which screw is adapted to engage the rear face of the casing front wall 21, and, in a rearward direction, by a screw 40 in the outboard end of a bracket 41 secured to the front wall 21 of the casing with the screw 40 positioned to engage the rear of the post 36.

The bottom plate 35 of the tiltable casing-wheel-assembly-supporting means 32 supports an electric motor 45 which, through reducing gearing 46, drives a pulley 48 connected by a belt 49 with a pulley 50 fixed to a drive shaft 51. This drive shaft is journaled, as best shown in FIG. 6, by bearings 52 in a support tube 53 which extends fore-and-aft through and is fixed to the post 36 and also extends through the hole 25 in the front casing wall 21 as best shown in FIGS. 5 and 6. The support tube 53 and drive shaft 51 are perpendicular to the post 36 and hence are at about a 12° included angle with reference to the horizontal. The forward end of the drive shaft 51 is in the form of a hexagonal head 54 which is provided with an annular groove 55 for the purpose of attaching a demountable casing-wheel-assembly-carrying head structure indicated generally at 56.

This demountable casing-wheel assembly head-carrying structure 56 comprises a rotatable tube 58 journaled by means of bearings 59 at its opposite ends on the end of the support tube 53 which projects forwardly from the post 36. Secured, as by a screw 60, in the forward end of the rotatable tube 58 is the enlarged cylindrical rear end of a coupling member 61. This coupling member is provided with a rearwardly opening hexagonal socket 62 in which the hexagonal head 54 of the rotatable drive shaft 51 is fitted, and a screw 63 in the coupling member 61 projects into the annular groove 55 in this hexagonal head 54 to demountable attach the coupling member 61 to the hexagonal head 54.

The coupling member 61 also has a forwardly projecting threaded shank 64 on which is screwed the nose 65 of a head 66 for supporting the casing-wheel assembly 12 to be balanced. This head 66 is shown as having a cylindrical body 68 fitting the exterior of the forward end of the rotatable tube 58 and as having a radially extending flange 69 with a forwardly facing flat circular face 70 surrounding the nose 65. This flange of the head 66 can also be provided with an annular series of permanent magnets 71 which are adapted to hold magnetically the metal body 13 of the casing-wheel assembly 12 against the flat face 70 during the operation of the device.

Adjustable counterweight means, indicated generally at 75, are mounted under the bottom panel 35 to bring the tiltable casing-wheel-assembly-supporting structure 32 and the slowly rotating casing-wheel assembly 12 mounted thereon back and forth through a point of overall balance. This counterweight assembly is carried by a drawerlike slide 76 for convenient placement and removal. Thus, as best shown in FIGS. 5 and 7—8, this slide has a channel-shaped sheet metal body 78 having front and rear end heads 79, 80 and top longitudinal side rails 81 which project into slideways 82 provided by transversely spaced supporting rails 83 which are L-shaped in cross section for this purpose and are suitable secured to the underside of the bottom plate 35 to extend fore-and-aft in line with the bottom opening 26 in the front wall 21 of the stationary casing 19. A reversible shaft 85 extends longitudinally centrally through the channel-shaped body 78 and through openings provided in the end heads 79, 80 thereof. This shaft is journaled in bearings 86 carried by these end heads and is driven by a small reversible electric motor 88 mounted on the front side of the front end head 79 of this drawerlike slide 76. Within this drawerlike slide 76, the central part of this shaft 85 is enlarged and threaded, as indicated at 89, there being exposed unthreaded shaft portions 90, 91 of reduced diameter within the drawerlike slide 76 beyond the front and rear ends of this enlarged threaded portion 89. The latter moves a counterweight 92 back and forth and for this purpose is preferably constructed as follows.

The counterweight has front and rear horizontal crossbars 93, 93 which are centrally apertured and penetrated by the shaft 85 and rest on and ride along the same, although additional supporting slideways (not shown) could obviously be provided for balancers for very heavy rotors. These crossbars are interconnected by and support a pair of longitudinal side weights 94 which are of any suitable cross-sectional form and ride along the undersides of the slide rails 81. A bracket 95 confines a nut 96 engageable with the central threaded part 89 of the shaft 85. When the motor 88 is driven in the direction to carry the nut 96 rearwardly of this central threaded part 89 onto the unthreaded rear part 91 of the shaft 85, it engages and compresses an abutment spring 98 which biases it back against the rear end of the enlarged threaded part 89 so that when the motor 88 reverses, the nut 96 again mates with the threads to move the weight 92 forwardly. Conversely, when the continued action of the motor 88 in this direction carries the nut forwardly of this central threaded part 89 onto the unthreaded front part 90 of the shaft 85, it engages and compresses an abutment spring 99 which biases it against the front end of the enlarged threaded part so that when the motor 88 reverses, the nut 96 again mates with the threads to move the weight 92 rearwardly.

Referring to the circuit diagram of FIG. 10, the numeral 100 represents a pushbutton which permits of closing the circuit from the opposite sides 101, 102 of the AC main line through the motor 45. A single-pole, double-throw switch and rectifier assembly 103 serves to permit manual operation of the motor 88 in either direction, by turning its manual knob 104 in a corresponding direction, the rectifiers 105, 106 providing halfwave rectification to suit a reversible motor 88 of the DC type. The manually actuated contact 108 of the switch 103 is shown as spring biased to a neutral or midpoint normal off position. A voltage-reducing transformer 110 supplies low-voltage AC across a potentiometer 111. The output of the potentiometer serves, via lines 112 and 113, to activate a meter 114 which is connected in series with a transducer 115. This transducer acts as the sensor and, as best shown in FIG. 5, is mounted on the rear face of the stationary front panel 21 in position to be actuated by the fore-and-aft movement of the post 36.

The basic principle utilized in the present device can best be understood by reference to FIG. 1 which diagrammatically illustrates the casing-wheel assembly 12 in a position supported on the casing-wheel-assembly-carrying head structure 56 to rotate coaxially therewith at a slow speed of, say, 3—8 r.p.m. The central plane of rotation R of the casing-wheel assembly is at an angle of approximately 10°—12° and when supported on the casing-wheel-assembly-carrying head structure assembly can tilt or oscillate freely about a horizontal fulcrum axis F which is the point of contact of the hardened-steel fulcrum points 29 with their socket members 33 of the balancing device as best illustrated in FIGS. 2, 4 and 5. The various points of overweight in such a casing-wheel assembly 12 can be those such as $w^1$, $w^2$, $w^3$ or $w^4$ in the sidewalls of the tire casing. Each of these points of overweight, whether present alone or in combination with any of the others, will exert a gravitational force that will develop turning moments of the casing-wheel assembly 12 about the horizontal of fulcrum axis F. Such turning force developed by all overweight points other than $w^1$ will be relatively small compared to that caused by $w^1$ due to their more or less close proximity to the vertical plane V through the fulcrum point F. Thus, this distance $D^1$ of the weight $w^1$ from this vertical plane V is much greater than the corresponding distances $D^2$, $D^3$ and $D^4$ of the weights $w^2$, $w^3$ and $w^4$ from this vertical plane V. An overweight point, such as $w^1$, therefore will, as it reaches the lowermost point in its orbit of rotation with the casing-wheel assembly 12 exert a force that is capable of causing the casing-wheel assembly 12 and the supporting means 32 to tilt or tip (to the left, FIGS. 1 and 5) if the casing-wheel assembly 12 and its supporting means 32 is in a state of equilibrium or balance about the axis F (or fulcrum pins 29) prior to the overweight point $w^1$ progressing to the lowermost point as shown in FIG. 1. The tendency for the casing-wheel assembly 12 and its supporting means 32 to so tilt will be in direct proportion to the gravitational force acting upon a weight located as at $w^1$. This is detected by the transducer 115 and its value shown on the meter 114 which can be calibrated in ounces or fractions thereof at the rim 16 of the casing-wheel assembly. When so interpreted a suitable counterweight such as a permanent magnet 120 of known value, can be attached to the rim 16 of the casing-wheel assembly diametrically opposite, but on the same side of the wheel, as the unbalance weight $w^1$. If this counterweight 120 is of the correct amount, and if there is only the single unbalance overweight point $w^1$, it will be found that the tendency of the casing-wheel assembly and its tiltable supporting means 32 to tilt or tip about the fulcrum axis F will be eliminated and that the state of equilibrium will not be disturbed as the casing-wheel assembly is slowly rotated.

As compensation for the overweight point $w^1$ is made, it will be found that one or more points of lesser effective overweight may then reveal their presence and compensation can be effected for these points of overweight in the same manner as for the point of overweight $w^1$.

With such balancing of one side of the casing-wheel assembly 12 is completed, the casing-wheel assembly can be reversed on the casing-wheel assembly holder 56 and the opposite side can be dealt with in like manner.

It will generally be found that the compensation weights 120 as positioned will not be of the same value on each half of the assembly and will not likely lay in the same radial direction.

OPERATION

In the operation of the unbalance detector, the following steps would be followed in correcting the unbalance in a casing-wheel assembly 12 is removed from a conventional passenger car.

1. The casing-wheel assembly 12 is first positioned with its central hub opening 14 in line with the nose 65 of the rotatable head 66 and moved rearwardly to fit over this nose and against the flat front circular face 70 of this head, the casing-wheel assembly 12 being thereby held in centered relation to the wheel-carrying head assembly 56 by the permanent magnets 71. This position of the casing-wheel assembly 12 is shown in FIGS. 1, 2 and 5.

2. The manual button 100 is then pressed to place the casing-wheel assembly in a slow state of rotation, say, 3—8 r.p.m., through the motor 45 in series with this switch (FIG. 10) the drive from this motor for this purpose comprising its reducing gearing 46, pulley 48, belt 49, pulley 50, shaft 51, its hex head 54, hex socket 62 of coupling member 61, and threaded shank 64 of this coupling member to the rotatable casing-wheel-assembly-carrying head structure 56 which includes the head 66, its permanent magnets 71 and the rotatable tube 58 on which it is mounted.

3. The knob 104 is then turned to bring the reading on the meter 114 to maximum. This turning actuates the motor 88 to rotate the threaded shaft 85 to drive the counterweight 92 to a point where it overbalances the casing-wheel-assembly-head-carrying structure 56. This knob 104 is then turned in the reverse direction to cause the meter reading to leave maximum and drop gradually to zero. At this time the meter 114 will show a fluctuation from zero upwardly, due to the pulsation against the transducer 115 caused by the overweight point at position $w^1$, and further turning of the knob 104 is stopped while noting the degree of fluctuation of the meter 114 which will be in rhythm with the rotation of the casing-wheel assembly 12. At this time the operator should note the point of the casing-wheel assembly 12 that is at the top or peak of its rotational travel as the meter 114 reads maximum. After this point is noted, the operator immediately attaches a compensating weight, such as a permanent magnet 120 of known value, on the rim 16 at the point that was noted to have been at the peak or topmost position on maximum meter reading. The amount or value of the weight 120 will be approximate, and correspond to the maximum reading of the hand on the meter 114. Any further compensation, which can be at any location around the casing-wheel assembly, can be made at this time by repeating the operation in adjusting the control knob 104 to obtain at all times a reading of the meter 114 which is from zero upwardly. Any further compensation (such as by the magnetic weights 120) can then be made and when such corrective compensation is completed, the meter 114 will be found to fluctuate upwardly from zero in such small range as to indicate that the remaining unbalance is of no importance to good operation of the casing-wheel assembly 12 when it is placed back onto position on the vehicle. The magnetic weights 120 can then be replaced with conventional wheel-balancing weights (not shown) of the same value.

As previously stated, when the one side of the casing-wheel assembly is so balanced, the casing-wheel assembly 12 is reversed in position on the casing-wheel assembly holder 56 and the opposite side balanced in like manner.

This type of compensation constitutes a compensation for static unbalance and so-called dynamic unbalance simultaneously without any distinction by the operator between the two types of unbalance.

This method of balancing at relatively low speeds of rotation (3—8r.p.m.) is quite a departure from the equipment now in use either on-the-car or off-the-car wherein the casing-wheel assembly is always rotated at high speeds with the attendant problems that are always associated with proper use of high-spaced equipment. Further such low-spaced balancing lends itself to complete automation of the balancing process including the automatic application of the permanent magnet weights 120.

The average casing-wheel assembly can be balanced as above outlined within 5 minutes and as the operator becomes familiar with the action of the device, this time can be reduced.

Outstanding features of the device are (a) simultaneous detection of static and dynamic unbalance at slow speed and correction requiring no particular skill or any ability to distinguish between the two types of unbalance, (b) rapid mounting and dismounting of the casing-wheel assembly, (c) adaptability to a broad range of tire sizes, (d) single control other than a pushbutton, (e) few moving parts all rotating slowly under light loading so as to have long life and low maintenance cost, (f) convenience in working position and for observation and (g) adaptation to automation including placement of corrective permanent magnet weights.

I claim:

1. A device for detecting the location and amount of unbalance in a rotatable body having at least one overweight point in its peripheral area, said device comprising a base, means for rotatably supporting said body in a tilted position with its axis of rotation being less than 90° included angle with reference to the horizontal, means for slowly rotating said body around said axis, means providing a fulcrum mount for said supporting means on said base to permit oscillation of said supporting means about a horizontal axis extending transversely and laterally of said axis of rotation and arranged in a vertical plane which intersects the plane of rotation of said body near the top of said body, said supporting means and body being movable horizontally in response to the torque effect about said horizontal axis of the lateral force component exerted by said body as said overweight point arrives at the lower extreme of its vertical movement in the rotation of said body, and means indicating the increase and decrease of said lateral force component as said body is so rotated.

2. A device for detecting the location and amount of unbalance in a rotatable body as set forth in claim 1 wherein said included angle of said axis of rotation with reference to the horizontal is about 12°.

3. A device for detecting the location and amount of unbalance in a rotatable body as set forth in claim 1 wherein said horizontal axis is below said rotatable body.

4. A device for detecting the location and amount of unbalance in a rotatable body as set forth in claim 1 wherein said means for rotatably supporting said body is counterweighted by a weight, and means adjustably moving said weight in a generally horizontal direction lengthwise of said axis of rotation.

5. A device for detecting the location and amount of unbalance in a rotatable body as set forth in claim 1 wherein said supporting means for rotatably supporting said body comprises a generally horizontal bottom part, a post rising from said bottom part and means journaling said rotatable body at the upper end of said post.

6. A device for detecting the location and amount of unbalance in a rotatable body as set forth in claim 5 wherein said bottom part of said supporting means is counterweighted by a weight, and means adjustably moving said counterweight in a generally horizontal direction lengthwise of said axis of rotation.

7. A device for detecting the location and amount of unbalance in a rotatable body as set forth in claim 1 wherein said indicating means comprises a transducer actuated in response to said movement of said supporting means and body horizontally in response to the lateral force component exerted by said body as said overweight point arrives at the lower extreme of its vertical movement in the rotation of said body.

8. A device for detecting the location and amount of unbalance in a rotatable body as set forth in claim 7 additionally including a meter in series with said transducer.

UNITED STATES PATENT OFFICE
CERTIFICATE OF CORRECTION

Patent No. 3,581,576          Dated June 1, 1971

Inventor(s) Alfred A. Reiser

It is certified that error appears in the above-identified patent and that said Letters Patent are hereby corrected as shown below:

Column 1, line 54, "hug" should read --hub--.

Column 2, line 13, after "angle" insert --with reference to the vertical, preferably an angle--.

Column 3, line 2, "demountable" should read --demountably--.

Column 3, line 26, "suitable" should read --suitably--.

Column 5, line 3, "is" should read --as--.

Column 6, line 1, "spaced" should read --speed-- (both occurrences).

Signed and sealed this 12th day of October 1971.

(SEAL)
Attest:

EDWARD M. FLETCHER, JR.          ROBERT GOTTSCHALK
Attesting Officer                Acting Commissioner of Patents